(12) United States Patent
Cunningham et al.

(10) Patent No.: US 8,487,993 B2
(45) Date of Patent: Jul. 16, 2013

(54) ESTIMATING VEHICLE HEIGHT USING HOMOGRAPHIC PROJECTIONS

(75) Inventors: Mark F. Cunningham, Oak Ridge, TN (US); Lorenzo Fabris, Knoxville, TN (US); Timothy F. Gee, Oak Ridge, TN (US); Frezghi H. Ghebretati, Jr., Sunnyvale, CA (US); James S. Goddard, Knoxville, TN (US); Thomas P. Karnowski, Knoxville, TN (US); Klaus-peter Ziock, Clinton, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 639 days.

(21) Appl. No.: 12/511,362

(22) Filed: Jul. 29, 2009

(65) Prior Publication Data

US 2011/0025841 A1    Feb. 3, 2011

(51) Int. Cl.
*H04N 7/18*    (2006.01)

(52) U.S. Cl.
USPC .......................................................... 348/135

(58) Field of Classification Search
USPC .......................................................... 348/135
IPC ....................................................... H04N 7/18
See application file for complete search history.

(56) References Cited

U.S. PATENT DOCUMENTS

| 7,313,252 | B2 | 12/2007 | Matei et al. |
| 7,356,425 | B2 | 4/2008 | Krahnstoever et al. |
| 7,403,658 | B2 | 7/2008 | Lin et al. |
| 2005/0237390 | A1 | 10/2005 | Mittal et al. |
| 2006/0197839 | A1 | 9/2006 | Senior et al. |
| 2008/0166019 | A1 | 7/2008 | Lee |
| 2009/0015675 | A1 | 1/2009 | Yang |
| 2009/0167866 | A1* | 7/2009 | Lee et al. ....................... 348/159 |
| 2009/0322878 | A1* | 12/2009 | Ishii .............................. 348/148 |
| 2010/0322476 | A1* | 12/2010 | Kanhere et al. ............... 382/103 |

OTHER PUBLICATIONS

Bojian et al., "Uncalibrated two-view metrology", Proceedings of the 17th International Conference on Patter Recognition, ICPR 2004, pp. 96-99, vol. 1 (Abstract Only).
Kanhere et al., "Vehicle Segmentation and Tracking from a Low-Angle Off-Axis Camera", IEEE Conference on Computer Vision and Pattern Recognition (CVPR), Jun. 2005, San Diego, California.
Liang et al., "Uncalibrated Two-View Metrology", Proceedings of the 17th International Conference on Pattern Recognition (ICPR'04).
Mirisola, "Trajectory recovery and 3D mapping from rotation-compensated imagery for an airship", 2007 IEEE/RSJ International Conference on Intelligent Robots and Systems, Oct. 29-Nov. 2, 2007, p. 1908-13, IEEE (Abstract Only).

(Continued)

*Primary Examiner* — David J. Czekaj
*Assistant Examiner* — Tracy Li
(74) *Attorney, Agent, or Firm* — Scully, Scott, Murphy & Presser, P.C.

(57) ABSTRACT

Multiple homography transformations corresponding to different heights are generated in the field of view. A group of salient points within a common estimated height range is identified in a time series of video images of a moving object. Inter-salient point distances are measured for the group of salient points under the multiple homography transformations corresponding to the different heights. Variations in the inter-salient point distances under the multiple homography transformations are compared. The height of the group of salient points is estimated to be the height corresponding to the homography transformation that minimizes the variations.

27 Claims, 6 Drawing Sheets

OTHER PUBLICATIONS

Neeraj et al., "Vehicle segmentation and tracking from a low-angle off-axis camera", Proceedings—2005 IEEE Computer Society Conference on Computer Vision, CVPR 2005, pp. 1152-1157, vol. 2 (Abstract Only).

Ravindran et al., "Plane based relative structure recovery", Proceedings—IEEE International Conference on Robotics and Automation, 2002, pp. 3056-3061, vol. 3 (Abstract Only).

Schwendner, "Homography based state estimation for aerial robots Homographie-basierte Zustandsschaetzung fuer Luftfahrt-Roboter", Lecture Notes in Computer Science, 2008, pp. 332-339, vol. 5243 (Abstact Only).

Ziock et al., "The Use of Gamma-Ray Imaging to Improve Portal Monitor Performance", 2007 IEEE Nuclear Science Symposium Conference Record, 2007, pp. 1198-1208.

* cited by examiner

ESTIMATING VEHICLE HEIGHT USING HOMOGRAPHIC PROJECTIONS

STATEMENT REGARDING FEDERALLY SPONSORED RESEARCH OR DEVELOPMENT

This invention was made with United States government support under Prime Contract No. DE-AC05-00OR22725 awarded by the U.S. Department of Energy. The United States government has certain rights in this invention.

FIELD OF THE INVENTION

The present invention relates to the field of video image processing, and particularly to apparatus and methods for identifying the height of features of a moving object from a time series of video images.

BACKGROUND OF THE INVENTION

The dimensions of a moving object as captured in a video image are difficult to estimate because many factors affect the distance among pixels representing the prominent features of the moving object. When a moving object is captured in a video image, information regarding the three-dimensional coordinates of each feature point in a physical world is reduced to information containing two-dimensional coordinates in a video image. Specifically, all points in the line of sight from a video camera are reduced to a single pixel in a video image. As the mapping of the three-dimensional locations to the two dimensional coordinates in the video image eliminates one dimension, multiple points in the physical world correspond to a single point in the video image. Thus, the distance between the video camera and any specific point of a moving object as captured in a video image must be estimated by other means.

The difficulty in the estimation of the dimensions of the moving object in a time series of video images is complicated by the image distortion inherent in all video cameras, and the variations in the distance at which the moving object may appear. For example, a video camera configured to monitor movement of vehicles on a road containing multiple lanes generates images in which a moving vehicle may be present in any lane.

Homography refers to taking measurements on the ground and transforming imagery taken from cameras in fixed positions to "real world" measurements. Referring to FIG. 1A, an example of a video image in a time series of video images as acquired by a video camera is shown. The distance between pixels representing a set of prominent features of the vehicle in a video image varies with the distance between the vehicle and the video camera. For example, a pixel-to-pixel distance of 10 pixels in FIG. 1A corresponds to different real-world distances depending on the located in the image even for the points on the road.

Referring to FIG. 1B, an example of a homographied image employing a homography reference plane that coincides with the plane of a surface of a road is shown. In a homographied image, all pixels in a video images are presumed to be a representation of an object in a homography reference plane, which is the plane of the road in this case. Thus, the distance between pixels representing physical points on the road is linearly proportional to the physical distance between the physical points on the road. However, the distance between pixels representing physical points on the vehicle is not proportional to the distance between the physical points on the vehicle. For example, a pixel-to-pixel distance of 10 pixels in FIG. BA is a fixed distance provided that the pixels are selected in the ground plane, which is the plane of the road, and also the homography reference plane of the homography transformation. Points outside the homography reference plane, i.e., out of the plane of the road, do not have a linear relationship between a pixel-to-pixel distance and the corresponding physical distance. Objects appear somewhat distorted on points that are not in the homography reference plane in homographied images.

Thus, estimation of the dimensions of features of the vehicle, such as the height of the vehicle, from homographied images requires additional knowledge of the distance between the camera and the moving vehicle, which cannot be extracted from the homographied images alone. There is considerable uncertainty in the accuracy of the data regarding the dimensions between features of the moving object as extracted from homographied images.

In view of the above, there exists a need for a method for accurately determining the dimensions between features of a moving object from a time series of video images. Particularly, there exists a need for estimating the height of a moving object from a time series of video images.

SUMMARY OF THE INVENTION

In one aspect of the present invention, multiple homography transformations corresponding to different heights are generated in the field of view. A group of salient points within a common estimated height range is identified in a time series of video images of a moving object. Inter-salient point distances are measured for the group of salient points under the multiple homography transformations corresponding to the different heights. Variations in the inter-salient point distances under the multiple homography transformations are compared. The height of the group of salient points is estimated to be the height corresponding to the homography transformation that minimizes the variations.

According to an aspect of the present invention, an apparatus for identifying a height of a feature of a moving object from a series of video images is provided. The apparatus includes:

an image recording device that stores a time series of video images; and
an image analysis device that is configured to execute a program of machine-executable instructions to identify a height of a group of salient points of a moving object, wherein the program includes the steps of:

identifying a group of salient point pixels in a time series of video images, wherein the group of salient point pixels corresponds to a group of salient points having a common estimated height range and located on a moving object;

generating a plurality of time series of homographied images by performing homography transformations on the time series of video images at homography reference planes having different heights above a surface on which the moving object travels;

measuring inter-salient-point pixel distances between at least one pair of salient point pixels in the group of salient point pixels for a plurality of homographied images within each of the plurality of time series of homographied images; and determining a height of the group of salient points from a surface on which the moving object travels based on a measurement data on the inter-salient-point pixel distances.

In one embodiment, the program further includes the step of measuring variations in the inter-salient-point pixel distances within each of the plurality of time series of homographied images.

In another embodiment, the program further includes the step of determining a time series of homographied images that corresponds to a least value among the measured variations in the inter-salient-point pixel distances, wherein the determined height of the group of salient points is a height of a homography reference plane for the determined time series of homographied images.

In even another embodiment, the measurement data includes the variations in the inter-salient-point pixel distances within each of the plurality of time series of homographied images.

In yet another embodiment, the group of salient points of the moving object is located on a topmost surface of the moving object.

In still another embodiment, the moving object is a vehicle that moves on a road, the feature is a roof of the vehicle, and wherein the group of salient points is points that correspond to points on the roof.

In a further embodiment, a direction connecting the at least one pair of salient points in each of the plurality of time series of homographied images is a direction of movement of the moving object.

In an even further embodiment, the program further includes the step of calibrating each of the homography transformations by placing calibration markers at different locations at a predefined height above the surface and measuring distances between the calibration markers in a video image for each of the homography transformations.

In a yet further embodiment, the common estimated height range is a range of a height of a topmost surface of the moving object.

In a still further embodiment, the apparatus further includes a video camera configured to generate the time series of video images by continuously capturing video images in real time.

In further another embodiment, the image analysis device includes a processor in a computer and the image recording device is embedded in the computer or externally connected to the computer.

According to another aspect of the present invention, a method for identifying a height of a group of salient points of a moving object is provided. The method includes:

identifying a group of salient point pixels in a time series of video images, wherein the group of salient point pixels corresponds to a group of salient points having a common estimated height range and located on a moving object;

generating a plurality of time series of homographied images by performing homography transformations on the time series of video images at homography reference planes having different heights above a surface on which the moving object travels;

measuring inter-salient-point pixel distances between at least one pair of salient point pixels in the group of salient point pixels for a plurality of homographied images within each of the plurality of time series of homographied images; and determining a height of the group of salient points from a surface on which the moving object travels based on a measurement data on the inter-salient-point pixel distances.

According to yet another aspect of the present invention, a machine-readable data storage device embodying a program of machine-executable instructions to identify a height of a group of salient points of a moving object is provided. The program includes the steps of:

identifying a group of salient point pixels in a time series of video images, wherein the group of salient point pixels corresponds to a group of salient points having a common estimated height range and located on a moving object;

generating a plurality of time series of homographied images by performing homography transformations on the time series of video images at homography reference planes having different heights above a surface on which the moving object travels;

measuring inter-salient-point pixel distances between at least one pair of salient point pixels in the group of salient point pixels for a plurality of homographied images within each of the plurality of time series of homographied images; and determining a height of the group of salient points from a surface on which the moving object travels based on a measurement data on the inter-salient-point pixel distances.

DETAILED DESCRIPTION OF THE INVENTION

Figure 1A:
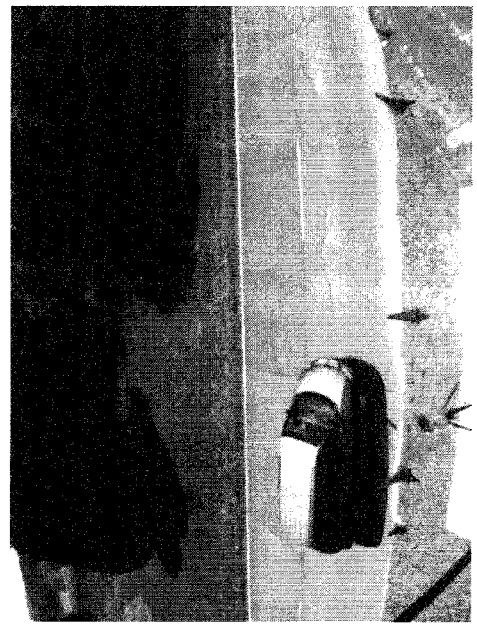
FIG. 1A is an example of a video image in a time series of video images as acquired by a video camera.
Figure 1B:
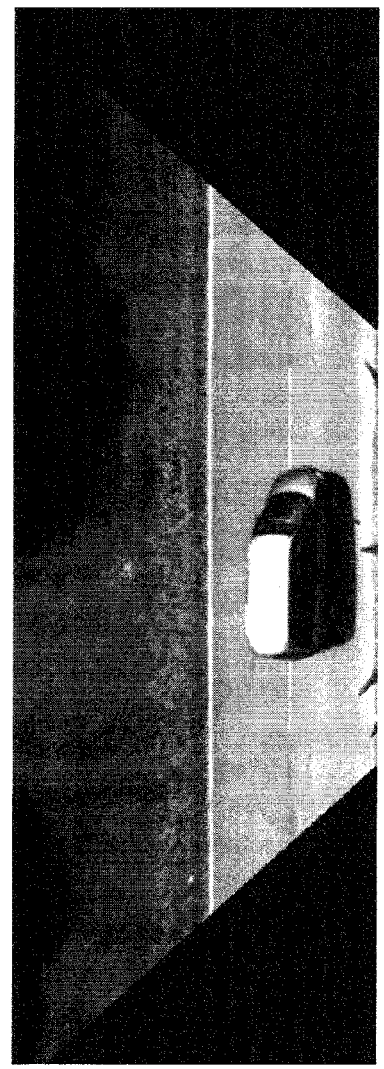
FIG. 1B is an example of a homographied image employing a homography reference plane that coincides with the plane of a surface of a road.

As stated above, the present invention relates to apparatus and methods for identifying the height of a group of salient points of a moving object from a time series of video images. The present invention is now described in detail with accompanying figures. It is noted that like and corresponding elements mentioned herein and illustrated in the drawings are referred to by like reference numerals.

As used herein, "video images" refer to any type of data set in digital format that may be manipulated by a computing device.

As used herein, a "time series" refers to a group of at least two elements that are generated at different points in time.

As used herein, a "vehicle" refers to any transportation equipment that moves on a surface. A vehicle may be, but is not limited to, a car or a truck moving on a road or any other solid surface, a ship moving on water, or any other manned or unmanned object that moves on a solid surface or a liquid surface while transporting personnel or a cargo.

As used herein, a "salient point" is a point on a surface of object that is distinguished from adjacent points by a distinct geometrical relationship, by a distinct color, by differences in reflectivity, or by any other optically differentiating feature relative to surrounding points on the surface of the object.

As used herein, a "salient point pixel" is a pixel in a video image that represents a salient point of an object.

As used herein, "homography" or "homography transformation" is a transformation that transforms straight lines in a physical plane within the field of view of a video image to a straight line a transformed image.

As used herein, a "homographied image" is an image generated by a homography transformation on a video image.

As used herein, a "homography reference plane" is a physical plane including straight lines that are transformed into straight lines in a homographied image by a homography transformation.

As used herein, a "common estimated height range" is the range of height for a group of points on an object in an image, wherein the range of height is estimated, or presumed, to be the same for all points in the group of points based on a prior knowledge of a common structure of the object. For example, all points on a roof of a typical vehicle are estimated, or presumed, to have a common estimated height range.

Figure 2:
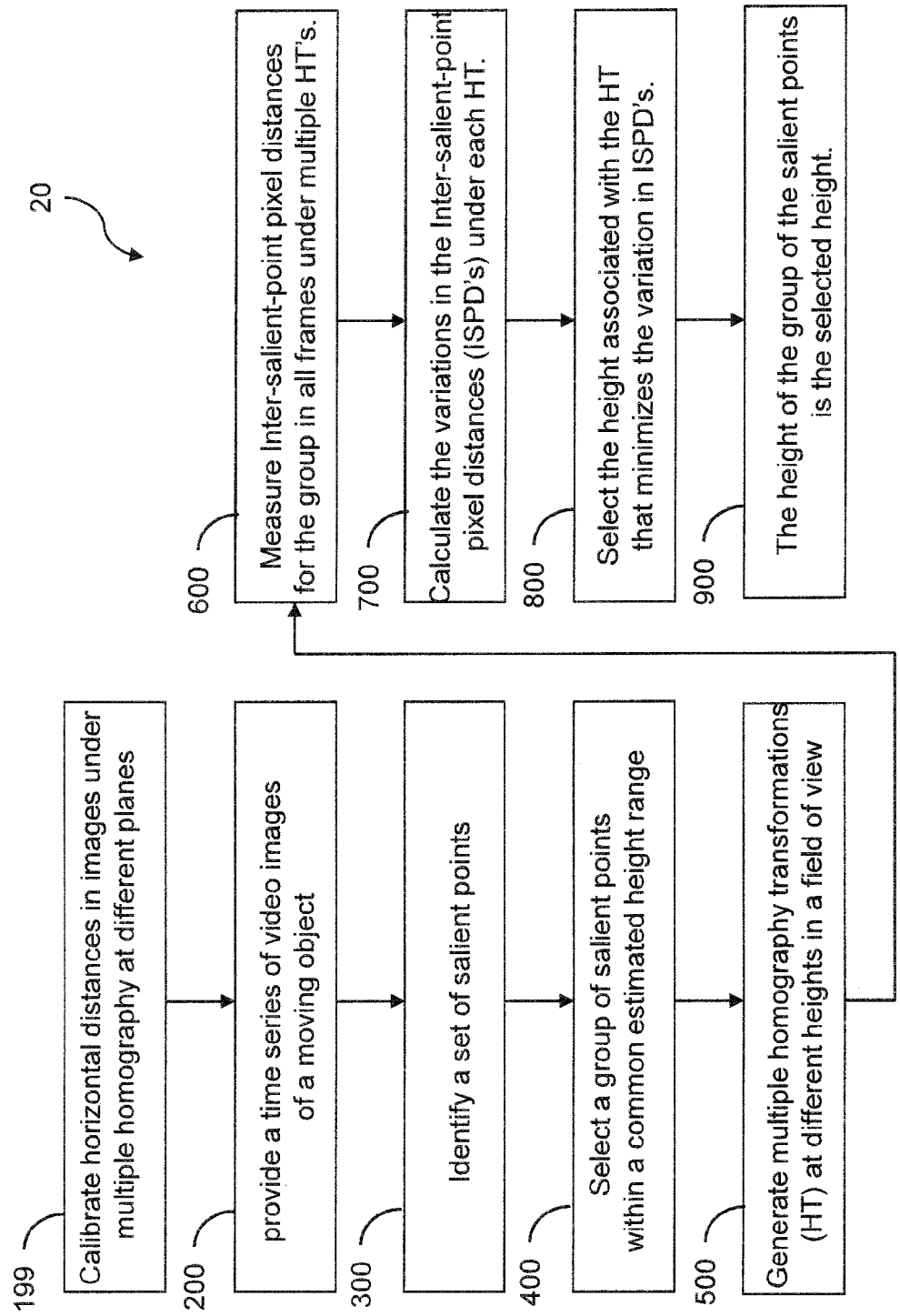
FIG. 2 is a flow chart illustrating the method of estimating the height of a group of salient points of a moving object according to an embodiment of the present invention.

Referring to FIG. 2, a flow chart 20 illustrates the method of estimating the height of a group of salient points of a moving object according to an embodiment of the present invention. The steps of the flow chart 20 may be implemented by an apparatus including an image recording device and an image analysis device. The image analysis device is configured to execute a program of machine-executable instructions to identify a height of a group of salient points of a moving object in a time series of video images. The apparatus may further include a video camera that is configured to generate a time series of video images by continuously capturing video images in real time. The image analysis device may include a processor in a computer.

An image recording device stores a time series of video images. Typically, the image recording device is embedded in the computer or externally connected to the computer. The image recording device may be embedded in a video camera, which may feed a time series of video images to a computer through signal ports and a cable or by wireless connection. A machine-readable data storage device may be employed to embody a program of machine-executable instructions to identify a height of a group of salient points of a moving object according to embodiments of the present invention.

Referring to step 199 of the flow chart 20, multiple homography transformations are performed employing different planes as a homography reference plane. The different planes are selected from within a space to be captured in a time series of video images. The different homography reference planes are parallel to, and are separated by, different distances from the plane of a surface on which a moving object travels within the field of view in a time series of video images, which may be subsequently generated. Horizontal distances in video images are calibrated under multiple homography transformations employing different homography reference planes. Typically, horizontal distances with each of the different homography reference planes are calibrated in video images including calibration markers having physical points within the homography reference plane. In other words, horizontal distances within each of the different homography reference planes are calibrated so that any distance between two physical points within each homography reference plane is proportional to distances between pixel images representing the two physical points in a video image.

Figure 3:
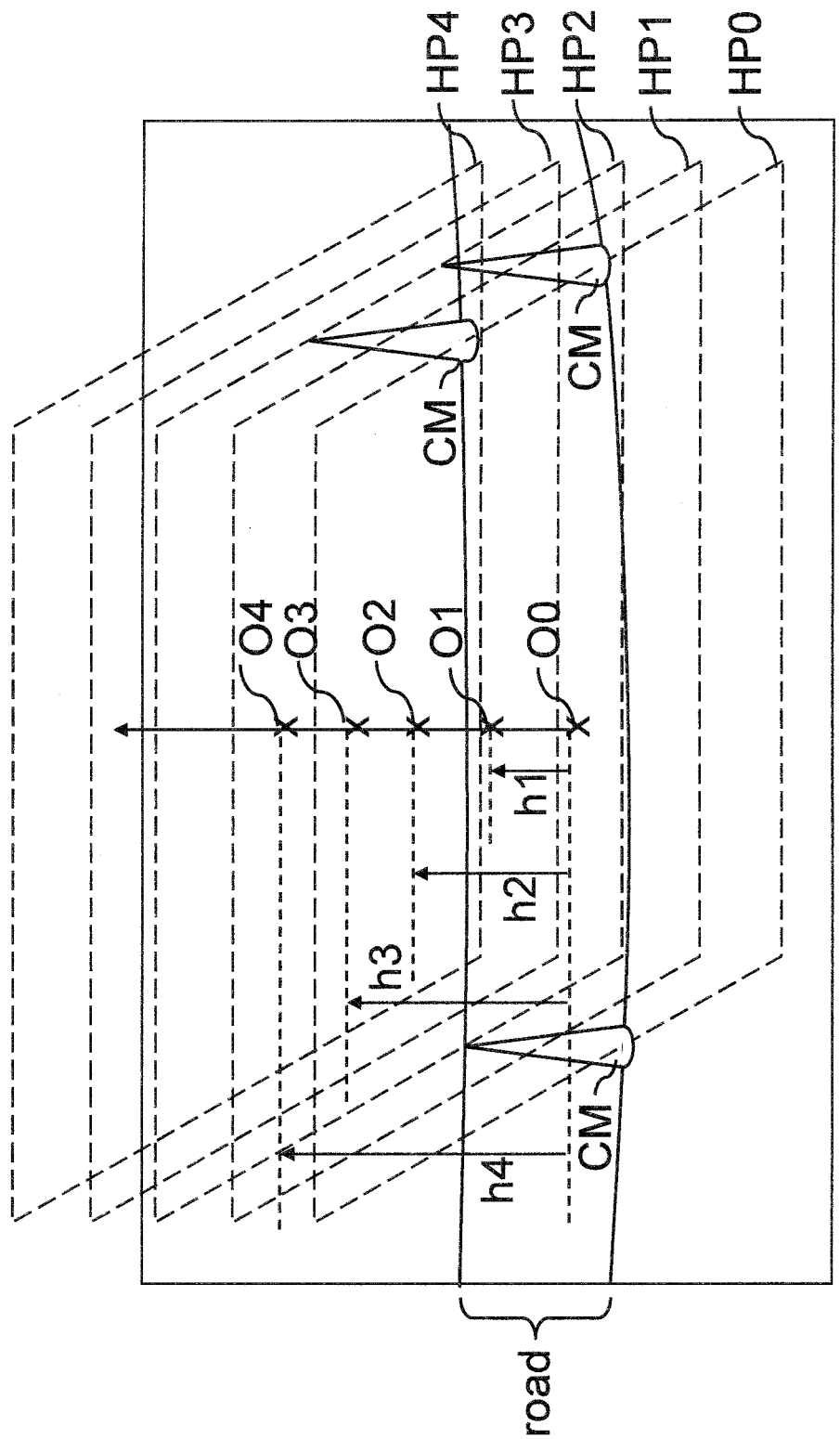
FIG. 3 is an illustration of homography reference planes that are parallel to, and are separated by different distances from, the plane of a road.

Referring to FIG. 3, examples of multiple homography reference planes are illustrated in a schematic of a video image, which shows a road and three calibration markers CM placed on the edges of the road and having a height of a second height h2. A road homography reference plane HP0 is a plane that is coplanar with the plane of the road, i.e., the plane that coincides with the plane of the road.

A first homography reference plane HP1 is parallel to the road homography reference plane HP0, and is separated by a first distance from the road homography reference plane HP0, i.e., the plane of the road. The first distance is herein referred to as a "first height" h1. Likewise, each of second, third, and fourth homography reference planes (HP2, HP3, HP4) is parallel to the road homography reference plane HP0, and is separated by different distances from the road homography reference plane HP0. The origins of the road homography reference plane HP0 and the first through fourth homography reference planes (HP1, HP2, HP3, HP4) are labeled O0, O1, O2, O3, and O4, respectively. The distance between the second homography reference plane and the road homography reference plane HP0 is herein referred to as a "second height" h2, the distance between the third homography reference plane and the road homography reference plane HP0 is herein referred to as a "third height" h3, and the distance between the fourth homography reference plane and the road homography reference plane HP0 is herein referred to as a "fourth height" h4. Additional homography reference planes may be added as needed to enhance the accuracy of estimation of the vertical height of one or more feature of a moving object on the road.

In each homography transformation, the distance between any pair of pixels that represent a pair of physical points in a corresponding homography reference plane is proportional to the physical distance between the pair of physical points. The calibration of the homography transformations may be effected by placing calibration markers at different locations within the corresponding homography reference plane. For example, the calibration markers may be placed at a predefined height above the surface of the road and distances between pixels representing the calibration markers may be measured in a video image for each of the homography transformations.

For example, the tips of the three calibration markers CM may be selected to lie in the second homography reference plane HP2. In general, any type of calibration markers may be employed provided that the calibration markers mark points located at predefined heights that correspond to the height of the homography reference planes from the surface on which a moving object travels.

Referring to step 200 of the flow chart 20, a time series of video images of a moving object is provided. The time series of video images may be generated after step 199, or may be generated prior to step 199, stored in a date storage medium, and subsequently retrieved. The time series of video images captures a moving object and at least a portion of the physical space including the multiple homography reference planes. The location of the moving object changes frame by frame in the time series of the video images. For example, the time series of video images may include a vehicle moving on and above the surface of a road. The physical space above the road includes multiple homography reference planes of the homography transformations performed at step 199.

Referring to step 300 of the flow chart 20, a set of salient points are identified in the time series of the video images. The salient points may be identified based on a distinct geometrical relationship, a distinct color, differences in reflectivity, or any other optically differentiating feature of the salient point relative to surrounding points on the surface of the object within each image of the time series of the video images. Some salient points may be identifiable across a plurality of video images, and some other salient points may be identifiable only in a single video image. Salient point pixels, which are pixels representing salient points of a moving object, are identified in each frame of the video images.

In one embodiment of the present invention, salient point pixels may be identified by analyzing the frames of the time series of the video images. In another embodiment of the present invention, salient point pixels may be identified by analyzing homographied images, which are generated from the time series of the video images. The homographied images may have any homography reference plane, i.e., may be selected from the multiple homography reference planes of step 199.

Figure 4:
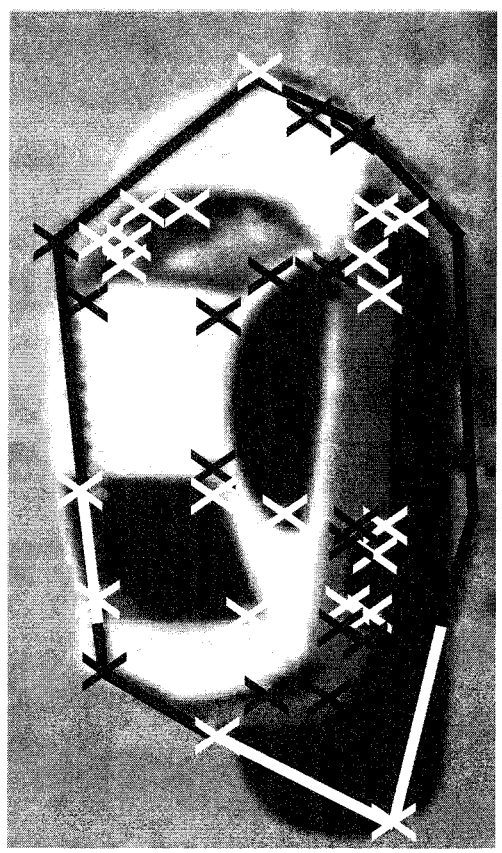
FIG. 4 is an example of identified salient point pixels in a homographied image in a time series of homographied images according to an embodiment of the present invention.

Referring to FIG. 4, an example of identified salient point pixels in a homographied image of a moving vehicle is shown. The homographied image in FIG. 4 is generated by employing a homography reference plane that coincides with the plane of the road. The salient point pixels are marked by X's in the homographied image. Guide lines connecting a selected set of salient point pixels are also shown.

Figure 5A:
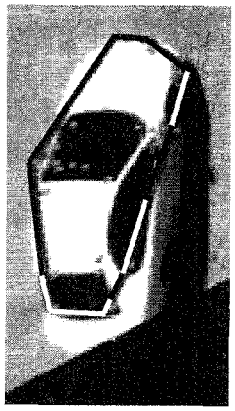
FIGS. 5A, 5B, and 5C are portions of images including a moving vehicle and salient point pixels identified thereupon from a set of homographied images according to an embodiment of the present invention.
Figure 5B:
Figure 5C:

Referring to FIGS. 5A, 5B, and 5C, portions of images including a moving vehicle are shown from a set of homographied images generated from an exemplary time series of video images from a camera with a fixed field of view. Each homographied image is cropped to display the moving vehicle and the immediate surrounding areas. The set of homographied images are generated employing the plane of the road as the homography reference plane.

Salient points are identified in each image and some of the identified salient point pixels are connected by lines. The salient points may be located directly on the moving vehicle, or may be located on a shadow of the moving vehicle. FIG. 5A corresponds to a first time point t1, FIG. 5B corresponds to a second time point t2, and FIG. 5C corresponds to a third time point t3. The moving vehicle travels from left to right in FIGS. 5A, 5B, and 5C, and the second time point t2 is later than the first time point t1 and prior to the third time point t3.

While the pixel-to-pixel distance in any of the homographied images is directly proportional to a physical distance for any pair of points on the road, the pixel-to-pixel distance the homographied images is in general non-zero for a pixel-to-pixel distance involving at least one pixel out of the plane of the road, i.e., the homography reference plane. In general, the distortion in the pixel-to-pixel distance between a pair of salient point pixels increases with the vertical distance of each point corresponding to a pixel from the homography reference plane.

In other words, distances between points within the homography reference plane are not distorted, i.e., proportional to the physical distances therebetween, but distances between points outside the plane are distorted in the homographied images. For example, in the images of FIGS. 5A, 5B, and 5C, the distance between the wheels is 60 pixels in each image, but the width from the corner of the front and back window is 38 pixels, 33 pixels, and 30 pixels in FIGS. 5A, 5B, and 5C, respectively, even though these points are parallel to the direction of travel.

Referring to step 400 of the flow chart 20, a group of salient point pixels are identified in a time series of video images. Alternately, the group of salient point pixels may be identified in any homographied images.

Figure 6A:
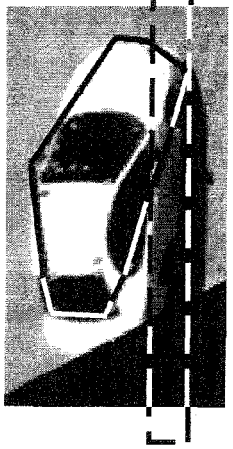
FIGS. 6A, 6B, and 6C are the portions of images including the moving vehicle, wherein a first group of salient point pixels within an estimated height range from the ground up to the height of passenger side windows according to an embodiment of the present invention.
Figure 6B:
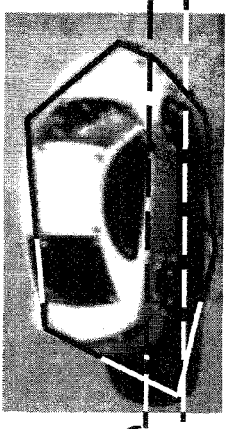
Figure 6C:
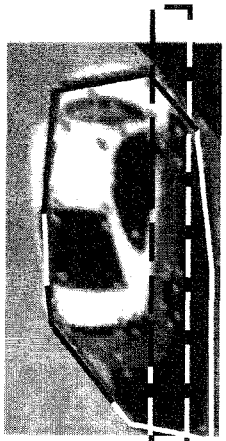

Referring to FIGS. 6A, 6B, and 6C, the portions of images including the moving vehicle are the same as the portions of the images in FIGS. 5A, 5B, and 5C, respectively. A first dotted rectangle Y includes areas of in the images of FIGS. 6A, 6B, and 6C within an estimated height range from the ground up to the height of passenger side windows. A first group of salient point pixels herein refers to salient point pixels within the first dotted rectangle Y.

Figure 7A:
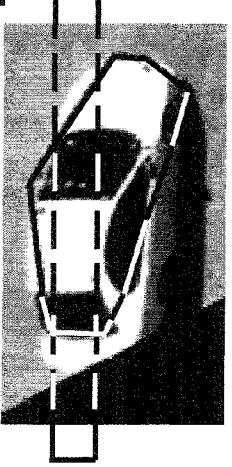
FIGS. 7A, 7B, and 7C are the portions of images including the moving vehicle, wherein a second group of salient point pixels within an estimated height range about the height of the roof of the moving vehicle according to an embodiment of the present invention.
Figure 7B:
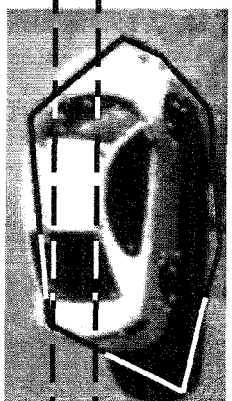
Figure 7C:
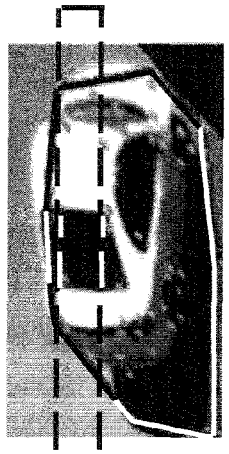

Referring to FIGS. 7A, 7B, and 7C, the portions of images including the moving vehicle are the same as the portions of the images in FIGS. 5A, 5B, and 5C, respectively. A second dotted rectangle Z includes areas of in the images of FIGS. 7A, 7B, and 7C within an estimated height range about the height of the roof of the moving vehicle. A second group of salient point pixels herein refers to salient point pixels within the second dotted rectangle Z and on the roof of the moving vehicle.

The salient points corresponding to the first group of salient point pixels are closer to the homography reference plane of the homography transformation, i.e., the plane of the road, than the salient points corresponding to the second group of salient point pixels. Because the first group of salient point pixels are distributed over a range of heights from the plane of the road, the distortion in the pixel-to-pixel distance relative to the physical distance between corresponding salient points cannot be eliminated in any other set of homographied images employing a homography reference plane located between the plane of the road and the plane intersecting the passenger side windows, i.e., between the planes corresponding to the lower limit and the upper limit of the height of the first dotted rectangle Y.

In contrast, the salient points corresponding to the second group of salient point pixels are confined within a narrow range of vertical distance from the plane of the road. Thus, the distortion in the pixel-to-pixel distance relative to the physical distance between corresponding salient points is minimized to an insignificant level in a set of homographied images employing a homography reference plane located at the plane of the roof of the moving vehicle. Another set of homographied images employing a homography reference plane located above or below the plane of the roof of the moving vehicle invariably increases the distortion in the pixel-to-pixel distance relative to the physical distance between corresponding salient points.

Preferably, a group of salient point pixels corresponding to a group of salient points on the moving vehicle are selected such that the group of salient points has a common estimated height range, i.e., a height range that is estimated to be common across all salient points within the group. In this example, the common estimated height range is a range of a height of a topmost surface of the moving object.

In one embodiment, the group of salient points of the moving object is located on a topmost surface of the moving object. For example, the moving object may be a vehicle that moves on a road, the group of salient points may be points that correspond to points on the roof of the vehicle. In this case, the different heights of the homography reference planes above the surface of the road may include a range of heights from 0.1 m to 10 m, although lesser and greater heights may also be employed. Preferably, the different heights of the homography reference planes encompass the range of all possible heights of vehicles to pass through the field of view of the video camera.

Referring to step 500 of the flow chart 20, multiple homography transformations are generated at different heights in the field of view of the time series of video images. Homography transformations on a time series of video images employing the multiple homography reference planes generates a plurality of time series of homographied images. Thus, a plurality of time series of homographied images is generated by performing homography transformations on the time series of video images at homography reference planes having different heights above a surface on which the moving object travels. In one embodiment, a direction connecting at least one pair of salient points in each of the plurality of time series of homographied images is a direction of movement of the moving object. In another embodiment, a direction connecting at least another pair of salient points in each of the plurality of time series of homographied images is different from the direction of movement of the moving object.

For example, the group of salient points of the moving vehicle may be located on the roof of the moving vehicle, and the corresponding salient point pixels may be pixels on or within an area of the roof of the moving vehicle in each of the homographied images such as the second group of salient point pixels in FIGS. 7A, 7B, and 7C.

Referring to step 600 of the flow chart 20, corresponding distances between pairs of salient point pixels are measured for the group of salient points within each of the plurality of time series of homographied images. The distances between pairs of salient point pixels are herein referred to "inter-salient-point pixel distances." The inter-salient-point pixel distances are measured between at least one pair of salient point pixels in the group of salient point pixels within each of the plurality of time series of homographied images.

In one embodiment, salient points that are located along the direction of travel may be grouped together and the inter-salient-point pixel distances corresponding to such salient points may be characterized for all frames in each of the plurality of time series of homographied images. In some cases, image processing may be performed to remove salient point pixels that are absent or under-represented in each frame.

Preferably, the group of salient points is selected so that the corresponding salient point pixels are present in at least two frames in each of the time series of homographied images, thereby enabling comparison of the inter-salient-point pixel distances across different frames in each of the time series of homographied images.

Referring to step 700 of the flow chart 20, distortion of the inter-salient-point pixel distances in each of the time series of homographied images is characterized by calculating the variations in the inter-salient-point pixel distances across frames in the same time series of homographied images under each homography transformation, i.e., for each of the time series of homographied images.

For example, the inter-salient-point pixel distances for the second group of salient point pixels in FIGS. 7A, 7B, and 7C on the roof of the moving vehicles are measured in all video images in each of the time series of homographied images. Within each of the time series of homographied images, the variations in inter-salient-point pixel distances for each pair of salient point pixels. The variations may be characterized by a standard variation in the inter-salient-point pixel distances for each pair of salient point pixels. Thus, for each of the time series of homographied images, variations in inter-salient-point pixel distances for at least one pair of salient points are calculated.

Referring to step 800 of the flow chart 20, variations in inter-salient-point pixel distances are compares across the time series of homographied images having different homography reference planes. The variations in the inter-salient-point pixel distances increases with the difference in the height of the subset of the salient points corresponding to the group of the salient point pixels and the height of the homography reference plane selected for calculation of the variations.

For example, the variations in inter-salient-point pixel distances for the second group of salient point pixels in FIGS. 7A, 7B, and 7C changes in other time series of homographied images (not shown) as the height of the homography reference plane changes. Specifically, as the height of the homography reference plane changes approaches the horizontal plane including the roof of the moving vehicle, the variations in inter-salient-point pixel distances for the second group of salient point pixels decreases.

The above observation may be employed to determine the height of the group of salient points of a moving object. Referring to step 900 of flow chart 20, the height associated with the homography transformation that minimizes the variation in inter-salient-point pixel distances are selected. The height that minimizes the variation in inter-salient-point pixel distances is also the height that produces the least image distortion of the selected group of salient points in the time series of homographied images. In other words, the time series of homographied images that corresponds to a least value among the measured variations in the inter-salient-point pixel distances is determined. Determination of the time series of homographied images also determines the corresponding homography reference plane and the height of the corresponding homography reference plane, which is also the estimated height of the selected group of salient points from the plane of the surface on which the moving object travels. The determined height of the group of salient points is the height of a homography reference plane for the determined time series of homographied images.

Thus, the height of the group of salient points is determined based on the measurement data from the plurality of time series of homographied images. The measurement data includes the variations in the inter-salient-point pixel distances within each of the plurality of time series of homographied images. Specifically, the determination, or selection, of the time series of homographied images and the corresponding homography reference plane is effected by selecting the homography reference plane that minimizes the variations in the inter-salient-point pixel distances for the selected group of salient points.

If the selected group of salient points is located on the topmost surface of a moving object, the height of the moving object may be estimated using a method disclosed herein. For example, if the topmost surface of the moving object is the roof of a vehicle, the height of the vehicle may be estimated by the methods of the present invention. If any prominent feature of the moving object is selected for the group of salient points, the height of the prominent feature of the moving object may be estimated. Such prominent feature of the moving object may be, but is not limited to, the height of side mirror on a vehicle, the height of the hood or trunk of a vehicle, the height of a deck of a boat, the height of the mast of a boat, the height of a nose, a wing, or a fuselage of an airplane on a runway, or any other optically prominent feature of any vehicle.

Figure 8:
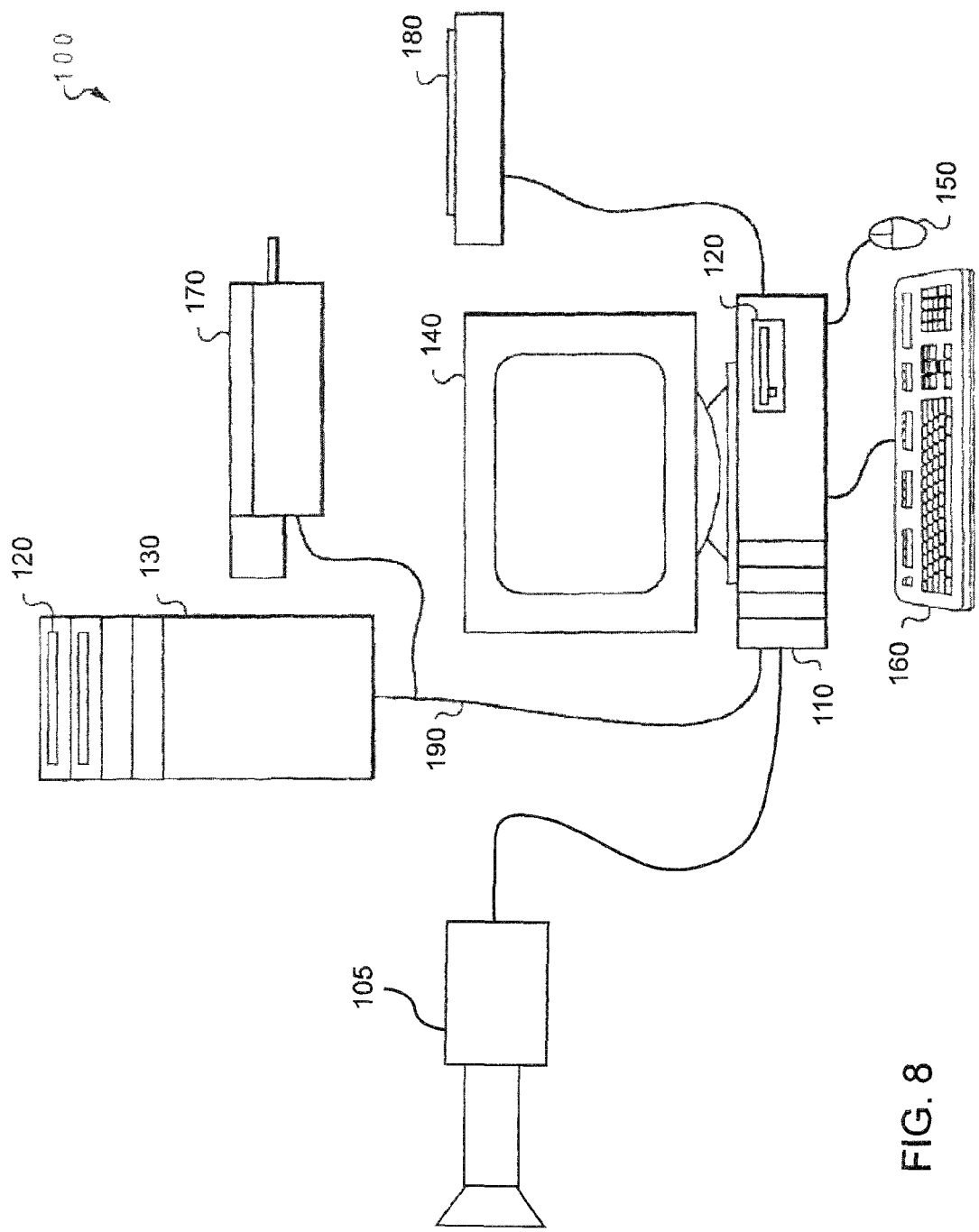
FIG. 8 is an exemplary apparatus according to the present invention.

Referring to FIG. 8, an exemplary apparatus 100 according to the present invention is shown. The exemplary apparatus 100 is a computer-based system in which a method embodiment of the invention may be carried out. The computer-based system includes a processing unit 110, which houses a processor, memory and other systems components (not shown expressly in the drawing) that implement a general purpose or special purpose processing system, or computer that may execute a computer program product. The computer program product may comprise media, for example a compact storage medium such as a compact disc, which may be read by the processing unit 110 through a disc drive 120, or by any means known to the skilled artisan for providing the computer program product to the general purpose processing system for execution thereby.

The exemplary apparatus 100 includes a video camera 105 that provide a time series of video images in real time to the processing unit 110. Alternately, the time series of video images may be stored in the processing unit 110 or in a server 130 and retrieved during execution of a program by the processing unit.

The computer program product may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit 110, as mentioned, or may be located on a remote system such as a server 130, coupled to processing unit 110, via a network interface such as an Ethernet interface. Monitor 140, mouse 150 and keyboard 160 are coupled to the processing unit 110, to provide user interaction. Scanner 180 and printer 170 are provided for document input and output. Printer 170 is shown coupled to the processing unit 110 via a network connection, but may be coupled directly to the processing unit 110. Scanner 180 is shown coupled to the processing unit 110 directly, but it should be understood that peripherals might be network coupled, or direct coupled without affecting the ability of the processing unit 110 to perform the method of the invention.

A data storage device that is programmable and readable by a machine and tangibly embodying or storing a program of instructions that are executable b the machine to perform the methods described herein may also be provided.

While the invention has been described in terms of specific embodiments, it is evident in view of the foregoing description that numerous alternatives, modifications and variations will be apparent to those skilled in the art. Other suitable modifications and adaptations of a variety of conditions and parameters normally encountered in image processing, obvious to those skilled in the art, are within the scope of this invention. All publications, patents, and patent applications cited herein are incorporated by reference in their entirety for all purposes to the same extent as if each individual publication, patent, or patent application were specifically and individually indicated to be so incorporated by reference. Accordingly, the invention is intended to encompass all such alternatives, modifications and variations which fall within the scope and spirit of the invention and the following claims.

What is claimed is:

1. An apparatus for identifying a height of a feature of a moving object from a series of video images, said apparatus comprising:
   an image recording device that stores a time series of video images; and
   an image analysis device that is configured to execute a program of machine-executable instructions to identify a height of a group of salient points of a moving object, wherein said program includes the steps of:
   identifying a group of salient point pixels in a time series of video images, wherein said group of salient point pixels corresponds to a group of salient points having a common estimated height range and located on a moving object;
   generating a plurality of time series of homographied images by performing homography transformations on said time series of video images at at least two homography reference planes having different heights and located above, and spaced from, a surface on which said moving object travels, wherein each time series among said plurality of time series corresponds to a homography reference plane that is different from any other of said at least two homography reference planes;
   generating a plurality of sets of inter-salient-point pixel distances by generating, for each selected homography reference plane among said at least two homography reference planes, a set of inter-salient-point pixel distances that are determined by measuring inter-salient-point pixel distances between at least one pair of salient point pixels in said group of salient point pixels for a time series among said plurality of time series of homographied images corresponding to said selected homography plane;
   measuring variations among inter-salient-point pixel distances for each set of inter-salient-point pixel distances among said plurality of sets of inter-salient-point pixel distances; and
   determining a height of said group of salient points from a surface on which said moving object travels based on comparison of said measured variations.

2. The apparatus of claim 1, wherein said program further includes the step of determining a set of inter-salient-point pixel distances that has least variations among said plurality of sets of inter-salient-point pixel distances, wherein said determined height of said group of salient points is a height of a homography reference plane for said set having said least variations.

3. The apparatus of claim 2, wherein each of said measured variations is a standard variation in inter-salient-point pixel distances in a set among said plurality of sets.

4. The apparatus of claim 1, wherein said group of salient points of said moving object is located on a topmost surface of said moving object.

5. The apparatus of claim 1, wherein said moving object is a vehicle that moves on a road, said feature is a roof of said vehicle, and wherein said group of salient points is points that correspond to points on said roof.

6. The apparatus of claim 1, wherein said different heights above said surface include a range of heights from 0.1 m to 10 m.

7. The apparatus of claim 1, wherein a direction connecting said at least one pair of salient points in each of said plurality of time series of homographied images is a direction of movement of said moving object.

8. The apparatus of claim 1, wherein said program further includes the step of calibrating each of said homography transformations by placing calibration markers at different locations at a predefined height above said surface and measuring distances between said calibration markers in a video image for each of said homography transformations.

9. The apparatus of claim 1, wherein said common estimated height range is a range of a height of a topmost surface of said moving object.

10. The apparatus of claim 1, further comprising a video camera configured to generate said time series of video images by continuously capturing video images in real time.

11. The apparatus of claim 1, wherein said image analysis device includes a processor in a computer and said image recording device is embedded in said computer or externally connected to said computer.

12. A method for identifying a height of a group of salient points of a moving object, said method comprising:
   identifying a group of salient point pixels in a time series of video images, wherein said group of salient point pixels corresponds to a group of salient points having a common estimated height range and located on a moving object;
   generating a plurality of time series of homographied images by performing homography transformations on said time series of video images at at least two homography reference planes having different heights and located above, and spaced from, a surface on which said moving object travels, wherein each time series among said plurality of time series corresponds to a homography reference plane that is different from any other of said at least two homography reference planes;
   generating a plurality of sets of inter-salient-point pixel distances by generating, for each selected homography reference plane among said at least two homography reference planes, a set of inter-salient-point pixel distances that are determined by measuring inter-salient-point pixel distances between at least one pair of salient point pixels in said group of salient point pixels for a time series among said plurality of time series of homographied images corresponding to said selected homography plane;
   measuring variations among inter-salient-point pixel distances for each set of inter-salient-point pixel distances among said plurality of sets of inter-salient-point pixel distances; and
   determining a height of said group of salient points from a surface on which said moving object travels based on comparison of said measured variations.

13. The method of claim 12, further comprising determining a set of inter-salient-point pixel distances that has least variations among said plurality of sets of inter-salient-point pixel distances, wherein said determined height of said group of salient points is a height of a homography reference plane for said set having said least variations.

14. The method of claim 12, wherein each of said measured variations is a variation in said inter-salient-point pixel distances within each of said plurality of time series of homographied images.

15. The method of claim 12, wherein said group of salient points of said moving object is located on a topmost surface of said moving object.

16. The method of claim 12, wherein said moving object is a vehicle that moves on a road, said feature is a roof of said vehicle, and wherein said group of salient points are points that correspond to points on said roof.

17. The method of claim 12, wherein said different heights above said surface include a range of heights from 0.1 m to 10 m.

18. The method of claim 12, wherein a direction connecting said at least one pair of salient points in each of said plurality of time series of homographied images is a direction of movement of said moving object.

19. The method of claim 12, further comprising calibrating each of said homography transformations by placing calibration markers at different locations at a predefined height above said surface and measuring distances between said calibration markers in a video image for each of said homography transformations.

20. The method of claim 12, wherein said common estimated height range is a range of a height of a topmost surface of said moving object.

21. The method of claim 12, further comprising generating said time series of video images by continuously capturing video images in real time.

22. A non-transitory machine-readable data storage device embodying a program of machine-executable instructions to identify a height of a group of salient points of a moving object, wherein said program includes the steps of:
   identifying a group of salient point pixels in a time series of video images, wherein said group of salient point pixels corresponds to a group of salient points having a common estimated height range and located on a moving object;
   generating a plurality of time series of homographied images by performing homography transformations on said time series of video images at at least two homography reference planes having different heights and located above, and spaced from, a surface on which said moving object travels, wherein each time series among said plurality of time series corresponds to a homography reference plane that is different from any other of said at least two homography reference planes;
   generating a plurality of sets of inter-salient-point pixel distances by generating, for each selected homography reference plane among said at least two homography reference planes, a set of inter-salient-point pixel distances that are determined by measuring inter-salient-point pixel distances between at least one pair of salient point pixels in said group of salient point pixels for a time series among said plurality of time series of homographied images corresponding to said selected homography plane;
   measuring variations among inter-salient-point pixel distances for each set of inter-salient-point pixel distances among said plurality of sets of inter-salient-point pixel distances; and
   determining a height of said group of salient points from a surface on which said moving object travels based on comparison of said measured variations.

23. The non-transitory machine-readable data storage device of claim 22 wherein said program further includes the step of determining a set of inter-salient-point pixel distances that has least variations among said plurality of sets of inter-salient-point pixel distances, wherein said determined height of said group of salient points is a height of a homography reference plane for said set having said least variations.

24. The non-transitory machine-readable data storage device of claim 23, wherein each of said measured variations is a standard variation in inter-salient-point pixel distances in a set among said plurality of sets.

25. The non-transitory machine-readable data storage device of claim 22, wherein each of said measured variations is a variation in said inter-salient-point pixel distances within each of said plurality of time series of homographied images.

26. The non-transitory machine-readable data storage device of claim 22, wherein a direction connecting said at least one pair of salient points in each of said plurality of time series of homographied images is a direction of movement of said moving object.

27. The non-transitory machine-readable data storage device of claim 22, wherein said program further includes the step of calibrating each of said homography transformations by placing calibration markers at different locations at a pre-defined height above said surface and measuring distances between said calibration markers in a video image for each of said homography transformations.

\* \* \* \* \*